United States Patent
Neubauer et al.

(10) Patent No.: US 12,492,034 B2
(45) Date of Patent: Dec. 9, 2025

(54) DEVICE FOR EQUIPPING CONTAINERS

(71) Applicant: KRONES AG, Neutraubling (DE)

(72) Inventors: Michael Neubauer, Grassau (DE); Wolfgang Roidl, Deuerling (DE); Heinrich Bielmeier, Pilsting-Grosskoellnbach (DE); Hartmut Davidson, Zeitlarn (DE); Stefan Scherl, Bernhardswald (DE)

(73) Assignee: KRONES AG, Neutraubling (DE)

( * ) Notice: Subject to any disclaimer, the term of this patent is extended or adjusted under 35 U.S.C. 154(b) by 187 days.

(21) Appl. No.: 18/016,431

(22) PCT Filed: Jul. 22, 2021

(86) PCT No.: PCT/EP2021/070537
§ 371 (c)(1),
(2) Date: Jan. 16, 2023

(87) PCT Pub. No.: WO2022/023162
PCT Pub. Date: Feb. 3, 2022

(65) Prior Publication Data
US 2023/0271738 A1    Aug. 31, 2023

(30) Foreign Application Priority Data
Jul. 31, 2020 (DE) .......................... 102020120295.4

(51) Int. Cl.
*B65C 9/04* (2006.01)
*B41J 3/407* (2006.01)
*B65C 9/26* (2006.01)

(52) U.S. Cl.
CPC ........... *B65C 9/045* (2013.01); *B41J 3/40733* (2020.08); *B65C 9/26* (2013.01)

(58) Field of Classification Search
CPC .. B65C 9/02; B65C 3/06; B65C 3/065; B65C 3/08; B65C 3/10; B65C 3/14; B65C 3/16;
(Continued)

(56) References Cited

U.S. PATENT DOCUMENTS 4,562,684 A   1/1986   Dreher
7,575,406 B2  8/2009   Hofmeister et al.
(Continued)

FOREIGN PATENT DOCUMENTS

AT     520119 A1   1/2019
CN    1759051 A   4/2006
(Continued)

OTHER PUBLICATIONS

English abstract for DE 19741476 A1 (1999).
(Continued)

*Primary Examiner* — Carson Gross
(74) *Attorney, Agent, or Firm* — Caesar Rivise, PC

(57) ABSTRACT

The invention relates to a device (10) for equipping containers (12), preferably with labels (44) or prints. The device has at least one equipping device (18, 20, 22, 23) for equipping containers (12) and a planar drive system (16) with a base element (30) and at least one movement device (32). The at least one movement device (32) has a container carrier (34) for holding a container (12). The at least one movement device (32) can be moved to the at least one equipping device (18, 20, 22, 23) by means of magnetic interaction with the base element (30) in order to equip the container (12) held in the container carrier (34). The device (10) can be used very flexibly.

24 Claims, 3 Drawing Sheets

(58) Field of Classification Search
CPC .......... B65C 3/163; B65C 3/166; B65C 3/26; B65C 9/0062; B65C 9/08; B65C 9/20; B65C 9/26; B65G 54/02
See application file for complete search history.

(56) References Cited

U.S. PATENT DOCUMENTS

| | | | |
|---|---|---|---|
| 7,641,749 | B2 | 1/2010 | Giacomazzi et al. |
| 9,096,073 | B2 | 8/2015 | Buchkremer |
| 9,239,335 | B2 | 1/2016 | Heise et al. |
| 9,302,463 | B2 | 4/2016 | Heidrich et al. |
| 9,335,336 | B2 | 5/2016 | Silbert et al. |
| 9,463,616 | B2 | 10/2016 | Domeier et al. |
| 9,533,506 | B2 | 1/2017 | Kraus et al. |
| 9,878,813 | B2 | 1/2018 | Eberhardt et al. |
| 9,969,570 | B2 | 5/2018 | Heise et al. |
| 10,040,638 | B2 | 8/2018 | Senn |
| 10,167,143 | B2 | 1/2019 | Senn et al. |
| 10,589,889 | B2 | 3/2020 | Saccardi |
| 10,622,921 | B2 | 4/2020 | Weber et al. |
| 10,669,049 | B2 | 6/2020 | Eberhardt et al. |
| 10,899,490 | B2 | 1/2021 | Kronseder |
| 11,358,383 | B2 | 6/2022 | Sharp et al. |
| 11,396,189 | B2 | 7/2022 | Ojima et al. |
| 11,708,226 | B2 | 7/2023 | Neubauer et al. |
| 2006/0037706 | A1 | 2/2006 | Putzer |
| 2009/0217628 | A1* | 9/2009 | Bittner ............. B65C 9/36 156/538 |
| 2013/0213579 | A1 | 8/2013 | Pedercini et al. |
| 2014/0234978 | A1 | 8/2014 | Heise et al. |
| 2016/0194158 | A1 | 7/2016 | Senn |
| 2017/0108522 | A1 | 4/2017 | Baer |
| 2017/0210502 | A1 | 7/2017 | Deckert et al. |
| 2017/0225814 | A1 | 8/2017 | Eberhardt et al. |
| 2017/0334215 | A1 | 11/2017 | Schach et al. |
| 2018/0186494 | A1 | 7/2018 | Kronseder |
| 2018/0236780 | A1 | 8/2018 | Peutl et al. |
| 2018/0362269 | A1 | 12/2018 | Marcantoni |
| 2020/0156816 | A1 | 5/2020 | Vignali et al. |
| 2020/0317384 | A1* | 10/2020 | Giuliani ............. B65C 9/02 |
| 2022/0281697 | A1* | 9/2022 | Duperray ........... B65G 47/68 |

FOREIGN PATENT DOCUMENTS

| | | |
|---|---|---|
| CN | 104417055 A | 3/2015 |
| CN | 104417068 A | 3/2015 |
| CN | 105722771 A | 6/2016 |
| CN | 106660642 A | 5/2017 |
| CN | 106660643 A | 5/2017 |
| CN | 107107628 A | 8/2017 |
| CN | 107735328 A | 2/2018 |
| CN | 107810147 A | 3/2018 |
| CN | 109890616 A | 6/2019 |
| CN | 111278654 A | 6/2020 |
| DE | 19741476 A1 | 3/1999 |
| DE | 60311110 T2 | 6/2007 |
| DE | 102010020958 A1 | 11/2011 |
| DE | 102010028769 A1 | 11/2011 |
| DE | 102011080121 A1 | 1/2013 |
| DE | 102011086015 A1 | 5/2013 |
| DE | 102011090044 A1 | 7/2013 |
| DE | 102013217669 A1 | 3/2015 |
| DE | 102013218402 A1 | 3/2015 |
| DE | 102014214696 A1 | 1/2016 |
| DE | 102015100444 A1 | 7/2016 |
| DE | 102015212140 A1 | 1/2017 |
| DE | 102018109083 A1 | 10/2019 |
| DE | 102018211343 A1 | 1/2020 |
| EP | 1225053 A2 | 7/2002 |
| EP | 2762317 A1 | 8/2014 |
| EP | 3109998 A1 | 12/2016 |
| EP | 3656707 A1 | 5/2020 |
| JP | S61217434 A | 9/1986 |
| JP | H05318715 A | 12/1993 |
| JP | 2002308227 A | 10/2002 |
| JP | 2017157674 A | 9/2017 |
| WO | 2013098202 A1 | 7/2013 |
| WO | 2016012158 A1 | 1/2016 |
| WO | 2017001076 A1 | 1/2017 |
| WO | 2018049125 A1 | 3/2018 |
| WO | 2019159117 A1 | 8/2019 |
| WO | 2020001987 A1 | 1/2020 |
| WO | 2020126218 A1 | 6/2020 |
| WO | 2021019054 A1 | 2/2021 |
| WO | WO-2021115545 A1 * | 6/2021 .......... B65B 65/003 |

OTHER PUBLICATIONS

English abstract for DE 102011080121 A1 (2013).
English abstract for JP 2002308227 A (2002).
International Search Report from corresponding PCT/EP2021/070537 mailed Nov. 17, 2021.
English abstract for AT 520119 A1 (2019).
English abstract for DE 102011086015 A1 (2013).
English abstract for DE 102018109083 A1 (2019).
English abstract for JP S61217434 A (1986).
English abstract for DE 102011090044 A1 (2013).
English abstract for DE 102015100444 A1 (2016).
English abstract for DE 102018211343 A1 (2020).
English Abstract for EP 2762317 A1 (2014).
English abstract of JP2017157674A.

* cited by examiner

FIG. 3
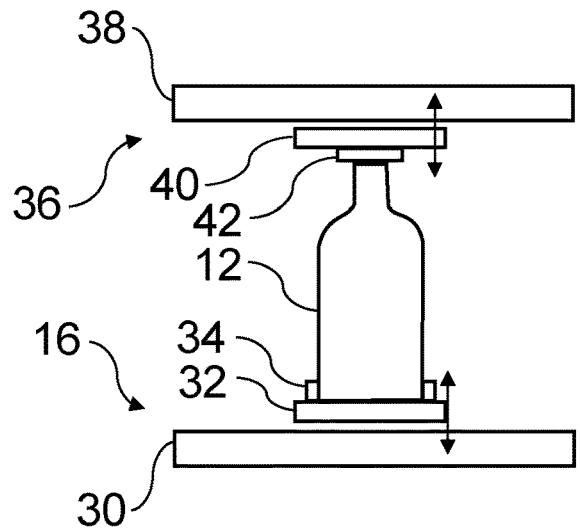
FIG. 4A    FIG. 4B
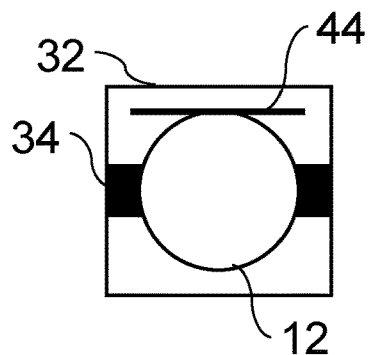    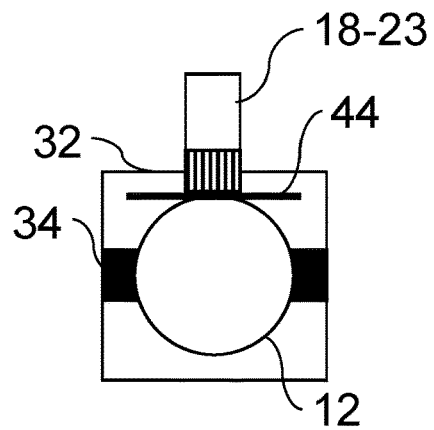
FIG. 4C    FIG. 4D
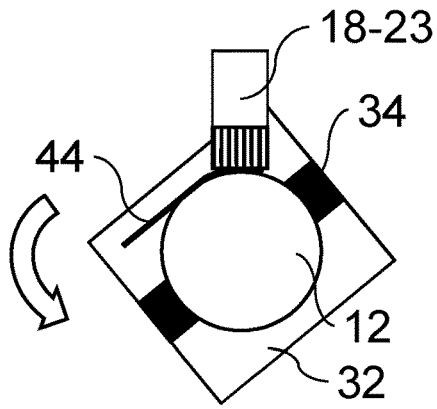    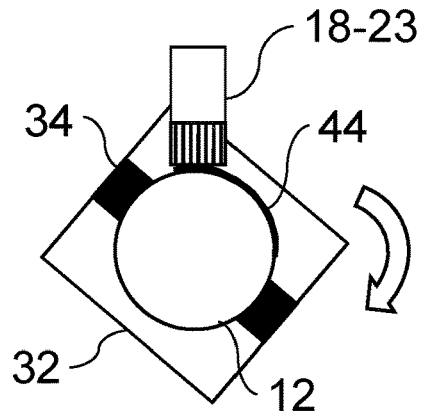

DEVICE FOR EQUIPPING CONTAINERS

CROSS-REFERENCE TO RELATED APPLICATIONS

This application is a U.S. National Phase Application of PCT/EP2021/070537, filed Jul. 22, 2021 which claims priority to DE 10 2020 120 295.4, filed Jul. 31, 2020, the contents of which applications are incorporated herein by reference in their entireties for all purposes.

TECHNICAL FIELD

The invention relates to a device for equipping containers, preferably with labels or imprints.

TECHNICAL BACKGROUND

Container processing systems can have labelling machines for labelling containers, e.g., bottles and cans. The containers may also be equipped in another way, e.g., with an imprint.

Labelling machines are known, for example, from DE 197 41 476 A1. In the labelling machine described there, a turntable is mounted rotatably on a tabletop arranged on an underframe. Labelling assemblies are arranged on the circumference of the turntable, the labelling assemblies serving to attach labels to the vessels transported on the turntable. For this purpose, each labelling assembly has a dedicated motor with which it forms a spatially closed unit. This unit is arranged on the turntable.

Owing to the labelling assemblies, it is possible to adapt the labelling machine to different equipping variants and/or types of vessels, for example different bottles. For this purpose, the assemblies with their associated motors can be removed from the tabletop and replaced by new assemblies which correspond to the changed vessels and have their own motors.

In addition, there are linear runners which dispense the label directly onto the bottle (e.g., sleeve machines or tube labelling machines).

The invention is based on the object of providing an alternative and/or improved device for equipping containers, preferably for increasing flexibility and for reducing a changeover time for different equipping variants or types of vessel.

SUMMARY OF THE INVENTION

The object is achieved by the invention. Advantageous developments are specified in the description.

One aspect of the present disclosure relates to a device for equipping containers, preferably with labels or imprints. The device has at least one equipping unit for equipping containers. The device has a planar drive system with a (e.g., planar) base element and at least one movement device. The at least one movement device has a container holder for holding a container. The at least one movement device is movable by means of magnetic interaction with the base element to the at least one equipping unit for equipping the container held in the container holder (e.g., starting from a transfer from an infeed conveyor).

The device affords great flexibility with respect to equipping containers. Different equipping features are made possible down to equipping a container on an individual basis (e.g., "labelling on demand"). The device can be adapted to different container shapes, container sizes, container infeed distances, etc. without retooling. For this purpose, for example, just a changed control of the movement devices may be required. The planar drive system does not have any contacting parts, and therefore it operates substantially free of wear. In contrast to a container carousel for equipping containers, there is no large rotating mass which has to be driven. In addition, the movement devices can carry out certain movements during the actual equipping operation that improve the equipping. For example, the movement devices can be inclined, rotated, lifted or lowered with respect to the base element during the equipping.

The container can preferably be equipped by the at least one equipping unit while the container holder holds the container.

Preferably, the at least one movement device, by means of magnetic interaction with the base element, can move the held and equipped container to an outfeed conveyor (e.g., for transfer to the outfeed conveyor).

In one exemplary embodiment, the at least one equipping unit has at least one imprinting unit. Advantageously, containers can thus be directly imprinted by the containers being moved by means of the movement devices to the imprinting unit.

In a further exemplary embodiment, the at least one equipping unit has at least one labelling unit and preferably at least one label-fixing unit (e.g., with a brush or rolling-off sponge). Advantageously, containers can thus be equipped with labels by the containers being moved by means of the movement devices to the labelling unit. Each labelling unit can preferably be assigned a dedicated label-fixing unit, or a plurality of labelling units are assigned to the same, preferably single, label-fixing unit.

In one embodiment, the device furthermore has a further planar drive system which is arranged opposite, preferably above, the planar drive system and is preferably configured (e.g., by means of a control unit) so as, together with the planar drive system, to move containers to the at least one equipping unit. Advantageously, a comparatively secure gripping of the containers can thus be ensured, particularly during the equipping at the equipping unit.

In one development, the containers can be clamped between the planar drive system and the further planar drive system. Advantageously, particularly secure gripping of the containers can thus be ensured.

In a further embodiment, the containers can be clamped between the planar drive system and the further planar drive system by means of a stroke movement of the at least one movement device with respect to the base element. Alternatively or additionally, the containers can be clamped between the planar drive system and the further planar drive system by means of a stroke movement of at least one further movement device of the further planar drive system with respect to a further base element of the further planar drive system. The clamping can thus be implemented in a simple manner using control technology.

Preferably, the at least one movement device can be supported and movable contactlessly by the base element on an upper side of the base element, and the at least one further movement device can be supported and movable contactlessly by the further base element on a lower side of the further base element.

A movement device of the planar drive system and a further movement device of the further planar drive system can preferably form a pair which is preferably movable synchronously.

In one embodiment variant, the at least one equipping unit has a plurality of equipping units, preferably labelling units.

The planar drive system can preferably be configured (e.g. by means of a control unit) such that the at least one movement device is moved in succession to the plurality of equipping units. Thus, for example, mixed labelling can be permitted. Alternatively, the at least one movement device can bypass or skip at least one of the plurality of equipping units, preferably depending on a desired equipping, preferably labelling, of the respectively held container. This can permit, for example, equipping on an individual container basis (e.g. labelling on demand).

In a further embodiment variant, the at least one equipping unit has a plurality of equipping units, and the at least one movement device has a plurality of movement devices. Preferably, the planar drive system can be configured (e.g. by means of a control unit) such that a first movement device of the plurality of movement devices can be overtaken by a second movement device of the plurality of movement devices, preferably if the second movement device bypasses or skips at least one of the plurality of equipping units at which the first movement device has stopped (e.g. depending on a desired equipping, preferably labelling, of the respectively held container). Therefore, for example, a container throughput can be increased.

In one exemplary embodiment, the planar drive system is configured (e.g. by means of a control unit) such that the at least one movement device is inclined during the equipping, preferably labelling, brushing on of a label, rolling off of a label or imprinting, in order to incline the respectively held container, preferably towards or away from the respective equipping unit. An improved equipping can thus advantageously be undertaken even on inclined surfaces of the container, e.g. in the container neck region.

In a further exemplary embodiment, the planar drive system is configured (e.g. by means of a control unit) to rotate the at least one movement device during the equipping, preferably labelling, brushing on of a label, rolling off of a label or imprinting, for rotating the respectively held container, preferably initially in a first direction of rotation and subsequently in an opposed, second direction of rotation. Advantageously, a uniform equipping of the container with a round container cross section can thus be permitted, e.g. when brushing on of a label.

It is also possible that, depending on the applied label (e.g. position and/or material (e.g. paper or tinfoil)), the at least one movement device is movable to different label-fixing units (e.g. with brushes or a rolling-on sponge).

In one embodiment, the containers have different sizes (e.g. diameters) and/or shapes. The planar drive system can preferably be configured (e.g. by means of a control unit) to move the at least one movement device to a differing closeness, depending on the different sizes and/or shapes of the containers, to the at least one equipping unit to compensate for the different sizes and/or shapes. The device can therefore be flexibly operated with different containers.

In a further embodiment, the container holder is rotatable by means of a, preferably mechanical, rotary mechanism (e.g. having a rotary plate) of the at least one movement device for rotating the held container, preferably for rotating the respectively held container during the equipping.

In one development, the at least one equipping unit has a (e.g. stationary) rotary unit which is designed to rotate the rotary mechanism, preferably by means of a form fit (e.g. meshing or interlocking) and/or force fit (e.g. frictional lock or by means of magnetic force) while a respective movement device is moved along the rotary unit. Advantageously, the movement device therefore does not need an additional electrical unit for the rotation. The "normal" drive of the movement device suffices to induce the rotation. The movement device also does not have to rotate itself.

In one embodiment variant, the rotary mechanism has a (e.g. externally) toothed portion, preferably a gearwheel, and/or the rotary unit has a (e.g. externally) toothed portion, preferably a (e.g. curved or rectilinear) rack. The toothed portions can preferably mesh with one another in order to rotate the rotary mechanism. Alternatively, the rotary mechanism can have, for example, a roller, and the rotary unit a roll-off surface for the roller. Alternatively, the rotary mechanism can interact, for example by means of magnetic force, with the rotary unit for rotating the rotary mechanism.

In a further embodiment variant, the planar drive system is configured (e.g. by means of a control unit) to move the respective movement device first of all in a first direction along the rotary unit in order to rotate the rotary mechanism in a first direction of rotation, and to move the respective movement device subsequently in an opposed, second direction along the rotary unit in order to rotate the rotary mechanism in a second direction of rotation opposed to the first direction of rotation. Therefore, for example, a label which is initially only attached centrally can be fixed and smoothed over the entire circumference of the container by a label-fixing unit.

It is possible for the rotary mechanism to be lockable by a locking device (e.g. with an elastically prestressed locking body (e.g. ball)) of the respective movement device in one or more predetermined positions.

In one exemplary embodiment, the base element is substantially frame-shaped, rectangular, circular or annular. In principle, the base element can therefore be adapted to different system layouts and construction space conditions. The planar drive system with the circular base element can be particularly suitable, for example, for replacing rotary labelling machines or rotary imprinting machines in already existing container processing systems, with the system layout not having to be changed. The movement devices can form, for example, the labelling machine container table and can be moved from one equipping unit to the next equipping unit.

In a further exemplary embodiment, the at least one equipping unit is arranged on the outer side or inner side of the base element.

In a further exemplary embodiment, the at least one movement device is supported contactlessly, by the base element, preferably on an upper side of the base element, by means of magnetic interaction.

The device as disclosed herein can preferably be used in a container processing system (e.g. for producing, cleaning, checking, filling, closing, labelling, imprinting and/or packaging containers for liquid media, preferably beverages or liquid foodstuffs).

Preferably, the term "control unit" can refer to electronics (e.g. with microprocessor(s) and data memory) which can take over open-loop control tasks and/or closed-loop control tasks and/or processing tasks, depending on the configuration. Even if the term "control" is used herein, "closed-loop control" or "feedback control" and "processing" can thus also expediently also be included or meant, as it were.

The previously described preferred embodiments and features of the invention can be combined with one another as desired.

BRIEF DESCRIPTION OF THE FIGURES

Further details and advantages of the invention will be described below with reference to the attached drawings, in which:

FIG. 3 shows a schematic side view of a planar drive system of a device for equipping containers according to an exemplary embodiment of the present disclosure;

FIGS. 4A-4D show schematic top views of a movement device of a planar drive system according to an exemplary embodiment of the present disclosure, the movement device holding a container on which a label is fixed.

The embodiments shown in the figures are at least partially identical, and therefore similar or identical parts are provided with the same reference signs, and reference is also made, for their explanation, to the description of the other embodiments or figures in order to avoid repetition.

DETAILED DESCRIPTION OF EXEMPLARY EMBODIMENTS

Figure 1:
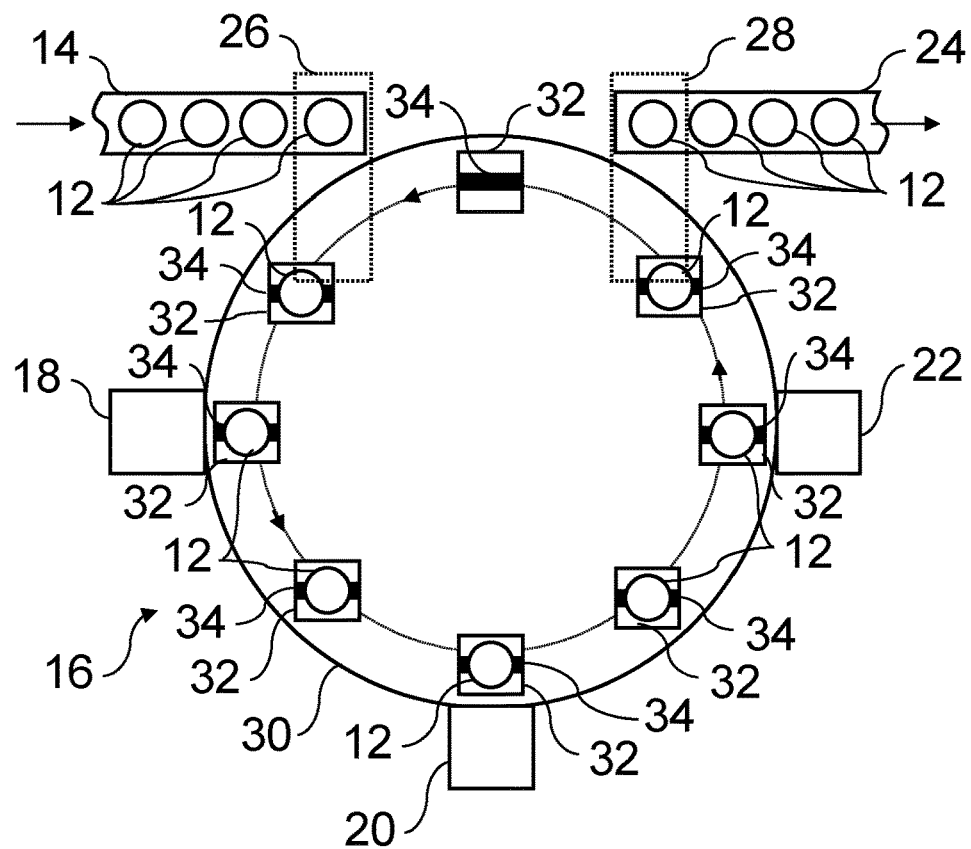
FIG. 1 shows a schematic top view of a device for equipping containers according to an exemplary embodiment of the present disclosure.

FIG. 1 shows a device 10 for equipping containers 12, e.g. bottles (glass bottles, PET bottles, etc.), cans, etc. The device 10 has an infeed conveyor 14, a planar drive system 16, equipping units 18, 20, 22 and an outfeed conveyor 24.

The containers 12 can be conveyed to the planar drive system 16 by means of the infeed conveyor 14. The containers 12 can be conveyed away from the planar drive system 16 by means of the outfeed conveyor 24. The infeed conveyor 14 and the outfeed conveyor 24 can be designed as any type of conveyor, for example as a belt conveyor.

The containers 12 can be transferred from the infeed conveyor 14 to the planar drive system 16 by means of a first transfer unit 26. The containers 12 can be transferred from the planar drive system 16 to the outfeed conveyor 24 by means of a second transfer unit 28. The transfer units 26, 28 can each have, for example, a ramp, a gripper, a slider or another technique by means of which the containers 12 can be transferred.

The planar drive system 16 has a base element 30 and a plurality of movement devices (movers or runners) 32. The movement devices 32 can be moved freely and independently of one another over the base element 30 by means of magnetic interaction with the base element 30. The movement devices 32 can also be rotated relative to the base element 30 (e.g. swivelling) by means of magnetic interaction with the base element 30. The movement devices 32 can also be inclined with respect to the base element 30 (e.g. pitching and/or rolling) by means of magnetic interaction with the base element 30. The movement devices 32 can likewise perform a stroke motion upwards or downwards relative to the base element 30 by means of magnetic interaction with the base element 30. A number of the movement devices 32 can be freely selectable, depending on the application, with at least one movement device 30 being provided.

The base element 30 forms a stator of the planar drive system 16. The movement devices 32 form runners of the planar drive system 16. The movement devices 32 are supported contactlessly by the base element 30. The base element 30 can have, for example, a plurality of electromagnets arranged in a distributed manner, e.g. electric coils.

The movement devices 32 can have permanent magnets. The electromagnets are preferably arranged in a matrix which extends in a plane of the base element 30 (here: a horizontal plane). A control unit (not illustrated) of the planar drive system 16 can control a power supply to the electromagnets of the base element 30 to build up electromagnetic fields with a desired field strength at a desired position of the base element 30. Forward propulsion, rotation, inclination and/or a stroke of the movement devices 32 can be brought about by corresponding electromagnetic fields of the electromagnets of the base element 30.

In the exemplary embodiment of FIG. 1, the base element 30 is oriented in a horizontal plane. The base element 30 furthermore has a circular shape. The equipping units 18, 20, 22 are arranged next to the base element 30, preferably on the outer side or, for example, on the inner side, in the case of a frame shape or ring shape of the base element 30. It is possible for more or fewer than three equipping units 18, 20, 22 to be included and/or for the equipping units 18, 20, 22 to protrude over the base element 30 in order to be able to be reached better. The movement devices 32 can be arranged above the base element 30 and, for example, can be rectangular. The movements of the movement devices 32 can be controlled by the control unit of the planar drive system 16.

The movement devices 32 each have a container holder 34. The container holder 34 is designed to firmly hold a container 20 during the transport by means of the respective movement device 20 and during the equipping at the equipping units 18, 20, 22. For example, the container holder 34 can be embodied as a gripper, a clamping holder, a suction holder or differently (with or without an actuator system).

The movement devices 32 each take over a container 12 at the first transfer unit 26. The container 12 is held by the respective container holder 34. The movement devices 32 move to one or more of the equipping units 18, 20, 22. The container 12 held by the container holder 34 is transported with the moving movement devices 32. The respective container 12 is equipped at the respective equipping units 18, 20 and/or 22 while said container continues to be held by the container holder 34. During the equipping operation, the movement devices 32 can stop, slow down, speed up, carry out predetermined movement patterns, etc., depending on the requirements of the respective equipping unit 18, 20, 22. After the equipping operation, the movement devices 32 move to the second transfer unit 28. The second transfer unit 28 transfers the respectively held container 12 to the outfeed conveyor 24. The movement devices 32 move further to the first transfer unit 26 in order to take over the next container 12. During the transfer of a container 12 at the transfer units 26, 28, the movement devices 32 can stop, slow down, speed up, carry out predetermined movement patterns, etc., depending on the requirements of the respective transfer unit 26, 28.

The movement devices 32 can move on any desired paths in relation to the base element 30. Preferably, all of the movement devices 32 move on a circular path, as is illustrated. The movement devices 32 may be moved lined up in a fixed sequence. However, it is also possible for the movement devices 32 to be able to overtake one another. For example, a container 20 of a first movement device 32 can be equipped specifically at one of the equipping units 18, 20 or 22 at which a container 20 of a second movement device 32 is not intended to be equipped. The second movement device 32 can then overtake the first movement device 32. The overtaking manoeuvre can be undertaken, for example, with respect to the base surface 30 on the inner side of the first movement device 32, preferably if the container 12 of the first movement device 32 is equipped specifically at one of the equipping units 18, 20 or 22. Overtaking manoeuvres are also conceivable, for example, whenever one of the movement devices 32 is stopped or stops because of a malfunction.

For the equipping of the containers 12, the movement devices 20, in particular depending on the respectively desired equipping of the respectively held container 12, can approach each of the equipping units 18, 20, 22 in succession, skip individual equipping units 18, 20, 22 or, for example, approach only one of the equipping units 18, 20, 22.

The equipping units 18, 20, 22 can have, for example, one or more imprinting units, labelling units and/or label-fixing units. An imprinting unit can imprint a container 20, preferably by means of direct printing. A labelling unit can attach a label to a container 20.

A label-fixing unit can fix and smooth a label, which has already been attached to a container 20, to the container 20. For example, the label-fixing unit can have a label brush-on unit for the brushing-on of labels. The label-fixing unit can also have a label roll-on sponge for the rolling-on of labels.

Depending on the design of the respective equipping unit 18, 20, 22, the movement devices 20 can perform a predetermined movement during the equipping operation and/or can take up a predetermined orientation during the equipping operation. For example, during the equipping operation, the movement device 20 can be rotated in order to rotate the held container 12 with respect to the base element 30. It is also possible for the movement device 20, during the equipping operation, to be inclined in order to incline the held container 12 with respect to the base element 30, for example towards or away from the respective equipping unit 18, 20, 22.

The device 10 can also be used with containers 12 which differ in size (e.g. in diameter). The movement devices 20 can be moved to a differing closeness, e.g. depending on the diameter of the respectively held container 12, to the respective equipping unit 18, 20, 22 to compensate for the different sizes. The same principle may also be used for differently shaped containers 12.

It is possible for the equipping unit 18 to be a first labelling unit, for the equipping unit 20 to be a second labelling unit, and for the equipping unit 22 to be a label-fixing unit, e.g. a label brushing-on unit or a label rolling-off sponge unit. In general terms, it is possible for a plurality of labelling units to share a common label-fixing unit.

It is also possible for the equipping units 18, 20, 22 to be configured in each case as labelling units with a respectively integrated label-fixing unit. In general terms, each labelling unit can be assigned a dedicated label-fixing unit.

It is likewise possible for the equipping units 18, 20, 22 to have both an imprinting unit and a labelling unit (optionally with a label-fixing unit). Maximum flexibility can thus be achieved in respect of the device 10 which therefore can be used both for imprinting and for labelling.

In addition, it is possible for the equipping units 18, 20, 22 to in each case identically equip the containers 12, for example to provide them with the same label or the same imprint. Accordingly, the movement devices 20 would each approach only one of the equipping units 18, 20, 22. Therefore, a plurality of containers 12 can be equipped in parallel by means of a plurality of movement devices 20 and the plurality of equipping units 18, 20, 22.

Alternatively, for example, the equipping units 18, 20, 22 can at least sometimes equip the containers 12 differently, for example can provide them with different labels or imprints. For example, a container-specific imprinting or labelling ("printing/labelling on demand") is therefore possible. It is also possible for the containers 20 to each be equipped with a plurality of labels or imprints. The movements devices 20 would then each approach only the one or the plurality of necessary equipping units 18, 20, 22.

Figure 2:
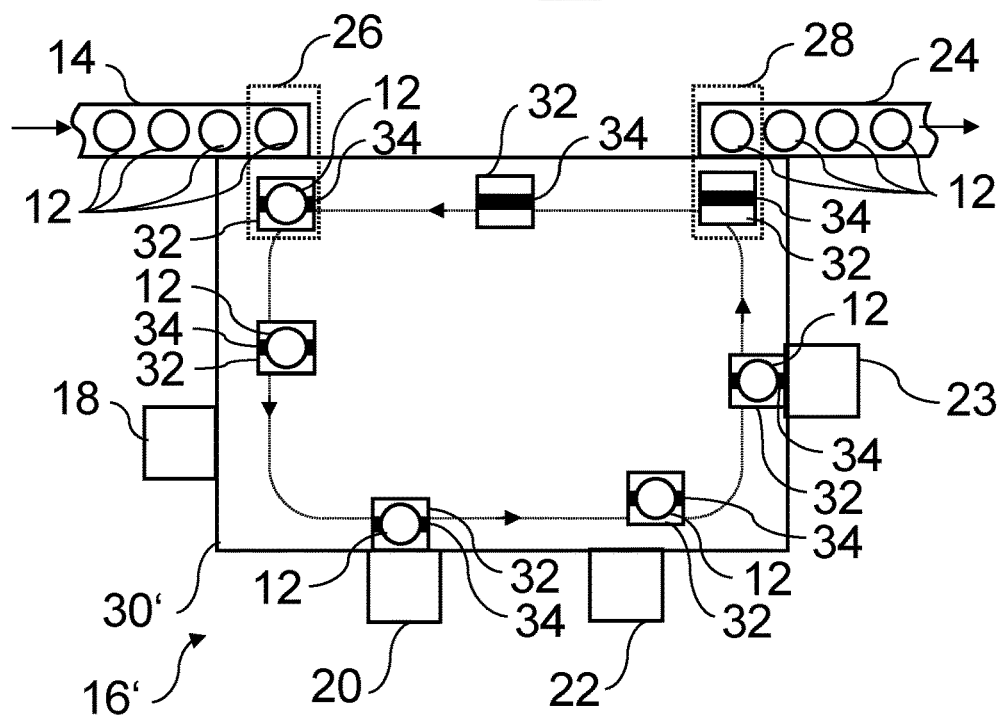
FIG. 2 shows a schematic top view of a device for equipping containers according to a further exemplary embodiment of the present disclosure.

FIG. 2 shows a further exemplary embodiment of the device 10' for equipping containers 12.

In contrast to the exemplary embodiment of FIG. 1, the device 10' of FIG. 2 has a rectangular base element 30'. As a further difference over the exemplary embodiment of FIG. 1, the device 10' of FIG. 2 has a further equipping unit 23. The further equipping unit 23 can be, for example, a label brush-on unit, and the equipping devices 18-22 can be, for example, labelling units which provide identical or different labels.

FIG. 3 shows that the device 10/10' in some variants can have the planar drive system 16 (as known from FIGS. 1 and 2) and additionally a further planar drive system 36.

The further planar drive system 36 can be arranged above the planar drive system 16. Like the planar drive system 16, the further planar drive system 36 can have a base element 38 and at least one movement device 40. Each movement device 32 of the planar drive system 16 can be assigned a movement device 40 of the planar drive system 36.

The movement devices 40 can additionally each have a container holder 42. The container holder 42 may be embodied differently than the container holder 34. The container holder 42 can hold the container 12, for example, at the container neck, for example by means of a sleeve or a spike.

While the at least one movement device 32 is supported by the base element 30 on an upper side of the base element 30, the at least one movement device 40 is supported by the base element 38 on a lower side of the base element 38.

The container holders 34, 42 can hold the container 12 from below and from above such that the container 12 can be held and transported particularly securely. It is additionally possible for the movement devices 32, 40 to clamp the respective container 12 between them. The clamping can be brought about by a stroke movement of the movement device 32 with respect to the base element 30 and/or a stroke movement of the movement device 34 with respect to the base element 38. For the clamping, for example, the two movement devices 32, 40 (or only one of them) can be moved towards one another by means of magnetic interaction with the respective base element 30 or 38. To release the clamping, for example, the two movement devices 32, 40 (or only one of them) can be moved away from one another by means of magnetic interaction with the respective base element 30 or 38.

FIGS. 4A to 4D show that, during the equipping operation, the movement device 32 can carry out a predetermined movement. The base element 30 is not illustrated for reasons of clarity.

FIG. 4A shows a situation in which a label 44 has already been adhesively bonded in a central region of the label 44 to an outer circumference of the container 12. The outer regions of the label 44 are already provided with an adhesive (e.g. hot glue or cold glue) but are not yet in contact with the container 12.

According to FIG. 4B, the movement device 32 can approach, preferably centrally, the equipping unit 18, 20, 22 or 23 embodied as a label-fixing unit (e.g. with a brush or roll-on sponge). The label-fixing unit is intended to subsequently completely fix the label 44 to the container 12.

According to FIG. 4C, the movement device 32 first of all rotates in a first direction of rotation (for example anticlockwise). The label-fixing unit brushes or rolls a first outer region of the label 44 onto the container 12. An angle of the rotation is selected in such a manner that the first outer region of the label 44 can be completely applied to the container 12.

According to FIG. 4D, the movement device 32 then rotates in a second direction of rotation (for example clockwise). The second direction of rotation is directed in the opposite direction to the first direction of rotation. The label-fixing unit brushes or rolls a second outer region of the label 44 onto the container 12. An angle of the rotation is selected in such a manner that the second outer region of the label 44 can be applied completely to the container 12.

It is also possible for the label 44 to initially be attached only at one outer end to the container 12. In such a case, a rotation of the movement device 32 in just one direction of rotation, e.g. by 360, may be sufficient.

Figure 5:
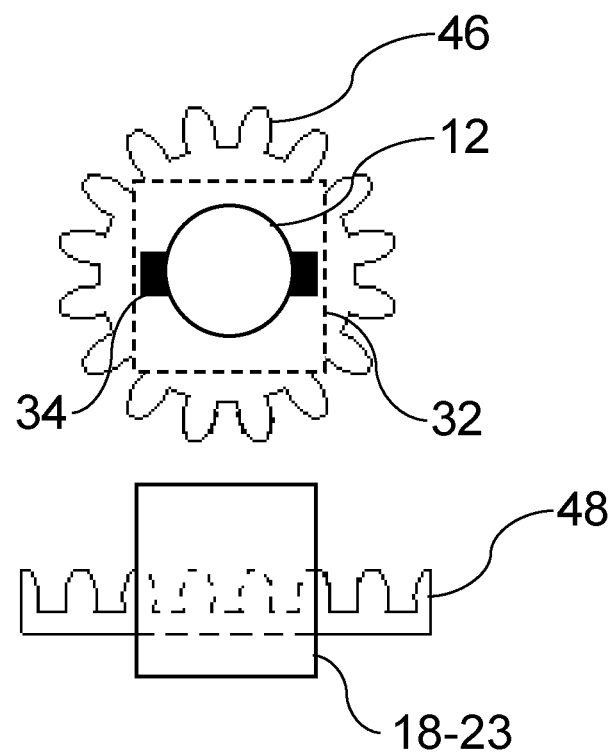
FIG. 5 shows a schematic top view of a movement device of a planar drive system and of an equipping unit with a rotary unit according to an exemplary embodiment of the present disclosure.

FIG. 5 shows a variant of the movement device 32 with a rotary mechanism 46. The rotary mechanism 46 can be used to rotate the contained containers 12 during the equipping operation as desired, e.g. without the respective movement device 32 having to be rotated. The base element 30 is not illustrated for reasons of clarity.

The rotary mechanism 46 permits rotation of the container holder 34 and therefore of the container 12 without the movement device 32 rotating for this purpose. For this purpose, the rotary mechanism 46 enters into interaction with a rotary unit 48 of the equipping unit 18, 20, 22 or 23.

The rotary mechanism 46 supports the container holder 34 rotatably on a base of the movement device 32. The rotary mechanism 46 can be, for example, an externally toothed rotary plate (for example gearwheel) to which the container holder 34 is attached. The rotary unit 48 is stationary and designed such that it can enter into interaction with the rotary mechanism 46 for rotating the rotary mechanism 46 if the movement device 32 is moved sufficiently closely along the rotary unit 48. For example, the rotary unit 48 can be a rack. The rack can be, for example, rectilinear, as illustrated in FIG. 5, or curved. The rotary mechanism 46 can mesh with the rotary unit 48 in order to rotate the rotary mechanism 46 and therefore the container holder 34 of the container 12.

It is possible for the rotary mechanism 46 and the rotary unit 48 to be embodied differently. For example, the rotary mechanism 46 could be embodied as a wheel or a roller, and the rotary unit 48 could be embodied as a roll-off surface. In another example, an outer circumference of the rotary mechanism 46 embodied as a rotary plate is produced from a (ferro)magnetic material, and the rotary unit has at least one permanent magnet, or vice versa. In principle, the rotary mechanism 46 can be rotated by the rotary unit 48, preferably by means of a force fit and/or by means of a form fit, when the movement device 32 moves along the rotary unit 48.

For example, with reference to the example of FIGS. 4A to 4D, the movement device 32 can first of all be moved in a first direction along the rotary unit 48. The rotary mechanism 46 rotates in a first direction of rotation. Subsequently, the movement device 32 can be moved in a second direction, which is opposed to the first direction, along the rotary unit 48. The rotary mechanism 46 rotates in a second direction of rotation opposed to the first one. A rotation in only a single direction is also possible.

The invention is not restricted to the preferred exemplary embodiments described above. On the contrary, a large number of variants and modifications is possible which likewise make use of the concept of the invention and therefore fall within the scope of protection. In particular, the invention also claims protection for the subject matter and the features of the dependent claims independently of the claims referred to. In particular, the individual features of independent Claim 1 are each disclosed independently of one another. In addition, the features of the dependent claims are also disclosed independently of all the features of independent Claim 1 and, for example, independently of the features relating to the presence and/or configuration of the at least one equipping unit and/or of the planar drive system of independent Claim 1.

LIST OF REFERENCE SIGNS

10 Device for equipping containers
12 Container
14 Infeed conveyor
16 Planar drive system
18-23 Equipping unit
24 Outfeed conveyor
26 First transfer unit
28 Second transfer unit
30 Base element
32 Movement device
34 Container holder
36 Further planar drive system
38 Base element
40 Movement device
42 Container holder
44 Label
46 Rotary mechanism
48 Rotary unit

The invention claimed is:

1. A device for equipping containers, said device comprising:
   at least one equipping unit for equipping containers; and
   a planar drive system comprising a base element and at least one movement device,
   wherein:
   the at least one movement device comprises a container holder for holding a container;
   the at least one movement device is movable by magnetic interaction with the base element to the at least one equipping unit for equipping the container held in the container holder;
   the container holder is rotatable by a rotary mechanism of the at least one movement device for rotating the held container; and
   the at least one equipping unit comprises a rotary unit which is designed to rotate the rotary mechanism, while a respective movement device is moved along the rotary unit.

2. The device according to claim 1, wherein:
   the at least one equipping unit comprises at least one imprinting unit; and/or
   the at least one equipping unit comprises at least one labelling unit.

3. The device according to claim 1, further comprising:
   a further planar drive system which is arranged opposite the planar drive system and is configured so as, together with the planar drive system, to move containers to the at least one equipping unit.

4. The device according to claim 3, wherein:
   the containers can be clamped between the planar drive system and the further planar drive system.

5. The device according to claim 3, wherein:
the containers can be clamped between the planar drive system and the further planar drive system by a stroke movement of the at least one movement device with respect to the base element; and/or
the containers can be clamped between the planar drive system and the further planar drive system a stroke movement of at least one further movement device of the further planar drive system with respect to a further base element of the further planar drive system.

6. The device according to claim 1, wherein:
the at least one equipping unit comprises a plurality of equipping units; and
the planar drive system is configured such that
the at least one movement device is moved in succession to the plurality of equipping units; or
the at least one movement device bypasses or skips at least one of the plurality of equipping units.

7. The device according to claim 1, wherein:
the at least one equipping unit comprises a plurality of equipping units;
the at least one movement device comprises a plurality of movement devices, and
the planar drive system is configured such that a first movement device of the plurality of movement devices can be overtaken by a second movement device of the plurality of movement devices.

8. The device according to claim 1, wherein:
the planar drive system is configured such that the at least one movement device is inclined during the equipping in order to incline the respectively held container, towards or away from the respective equipping unit.

9. The device according to claim 1, wherein:
the planar drive system is configured to rotate the at least one movement device during the equipping for rotating the respectively held container.

10. The device according to claim 1, wherein:
the containers have different sizes and/or shapes; and
the planar drive system is configured to move the at least one movement device to a differing closeness, depending on the different sizes and/or shapes of the containers, to the at least one equipping unit to compensate for the different sizes and/or shapes.

11. The device according to claim 1, wherein:
the rotary mechanism comprises a toothed portion, and the rotary unit comprises a toothed portion, which mesh with one another for rotating the rotary mechanism; or
the rotary mechanism comprises a roller and the rotary unit comprises a rolling-off surface for the roller; or
the rotary mechanism interacts by magnetic force with the rotary unit in order to rotate the rotary mechanism.

12. The device according to claim 1, wherein:
the planar drive system is configured:
to move the respective movement device first of all in a first direction along the rotary unit in order to rotate the rotary mechanism in a first direction of rotation, and
to move the respective movement device subsequently in an opposed, second direction along the rotary unit in order to rotate the rotary mechanism in a second direction of rotation opposed to the first direction of rotation.

13. The device according to claim 1, wherein:
the base element is substantially frame-shaped, rectangular, circular or annular; and/or
the at least one equipping unit is arranged on an outer side or an inner side of the base element; and/or
the at least one movement device is supported contactlessly by the base element by magnetic interaction.

14. The device according to claim 1, which is configured for equipping containers with at least one of labels and imprints.

15. The device according to claim 1, wherein
the at least one equipping unit comprises at least one imprinting unit; and/or
the at least one equipping unit comprises at least one labelling unit and at least one label-fixing unit,
wherein:
each labelling unit is assigned a dedicated label-fixing unit; or
a plurality of labelling units is assigned to the same single, label-fixing unit.

16. The device according to claim 1, further comprising:
a further planar drive system which is arranged opposite and above the planar drive system and is configured so as, together with the planar drive system, to move containers to the at least one equipping unit.

17. The device according to claim 1, wherein:
the at least one equipping unit comprises a plurality of equipping units which are labelling units; and
the planar drive system is configured such that the at least one movement device is moved in succession to the plurality of labelling units.

18. The device according to claim 1, wherein:
the at least one equipping unit comprises a plurality of equipping units;
the at least one movement device comprises a plurality of movement devices, and
the planar drive system is configured such that a first movement device of the plurality of movement devices can be overtaken by a second movement device of the plurality of movement devices if the second movement device bypasses or skips at least one of the plurality of equipping units at which the first movement device has stopped.

19. The device according to claim 1, wherein:
the planar drive system is configured such that the at least one movement device is inclined during the equipping, labelling, brushing on of a label, rolling off of a label or imprinting, in order to incline the respectively held container towards or away from the respective equipping unit.

20. The device according to claim 1, wherein:
the planar drive system is configured to rotate the at least one movement device during the equipping labelling, brushing on of a label, rolling off of a label or imprinting, for rotating the respectively held container firstly in a first direction of rotation and subsequently in an opposed, second direction of rotation.

21. The device according to claim 1, wherein:
the rotary mechanism includes a mechanical rotary mechanism for rotating the respectively held container during the equipping.

22. The device according to claim 1, wherein:
the rotary unit is further designed to rotate the rotary mechanism by a form fit and/or force fit while the respective movement device is moved along the rotary unit.

23. The device according to claim 1, wherein:
the rotary mechanism comprises a toothed portion, which is a gearwheel, and the rotary unit comprises a toothed portion, which is a rack, which mesh with one another for rotating the rotary mechanism; or the rotary mechanism comprises a roller and the rotary unit comprises a rolling-off surface for the roller; or the rotary mechanism interacts by magnetic force with the rotary unit in order to rotate the rotary mechanism.

24. The device according to claim 1, wherein:

the base element is substantially frame-shaped, rectangular, circular or annular; and/or the at least one equipping unit is arranged on an outer side or an inner side of the base element; and/or the at least one movement device is supported contactlessly on an upper side of the base element by magnetic interaction.

\* \* \* \* \*